Jan. 20, 1959    C. B. HARROP    2,869,657
CULTIVATOR CLAMP
Filed July 12, 1954
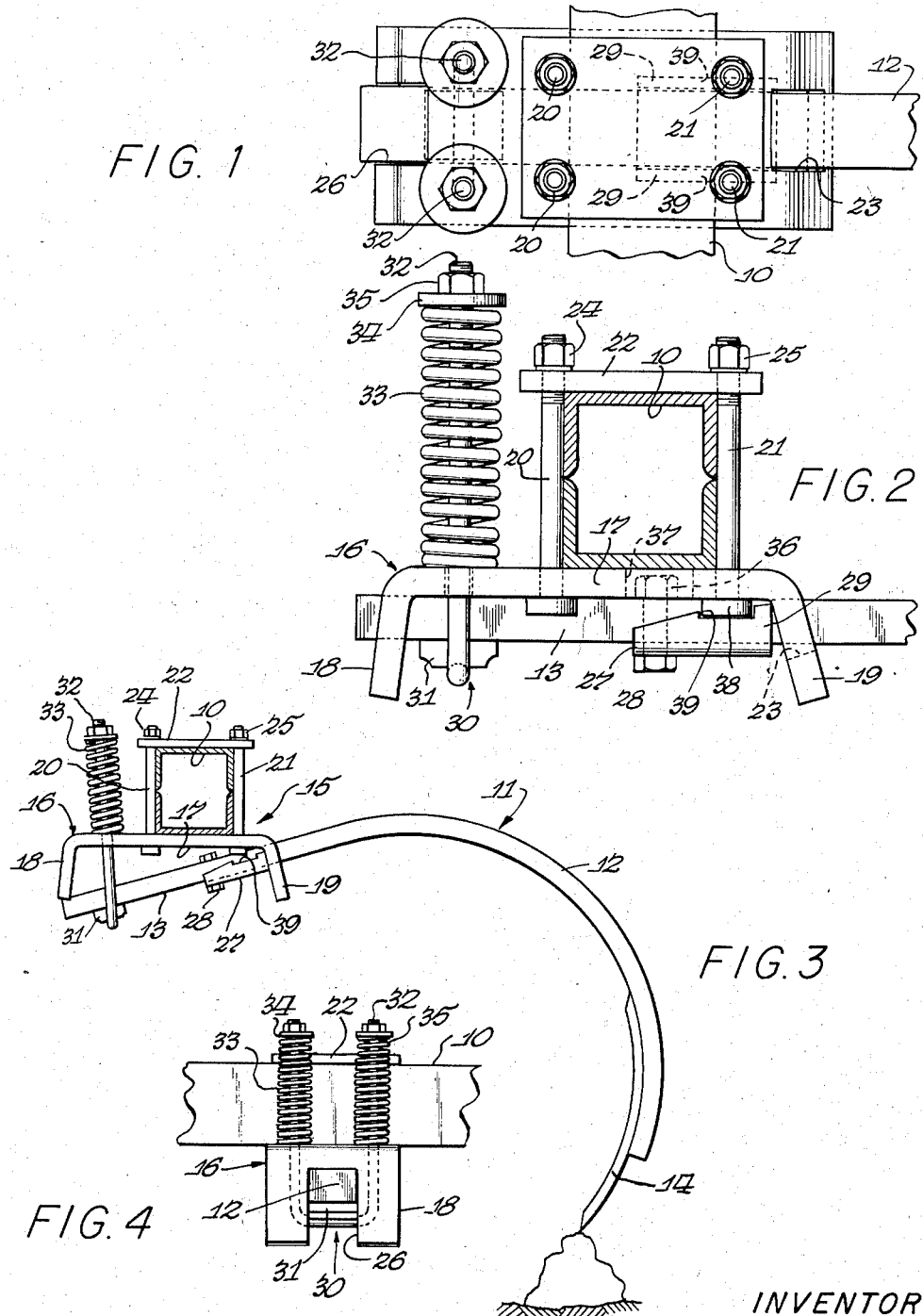
INVENTOR
CLIFFORD B. HARROP
ATTORNEY

United States Patent Office 2,869,657
Patented Jan. 20, 1959

1

2,869,657

CULTIVATOR CLAMP

Clifford B. Harrop, Ancaster, Ontario, Canada, assignor to International Harvester Company, a corporation of New Jersey Application July 12, 1954, Serial No. 442,623

6 Claims. (Cl. 172—710)

This invention relates to agricultural implements and particularly to mounting apparatus for securing an earth-working tool to a supporting frame.

An object of the invention is the provision of novel means for mounting an earth-working tool upon a support.

Another object of the invention is the provision, in an agricultural implement including a traveling supporting frame, of improved clamping apparatus for securing the earth-working tool to the frame.

Another object of the invention is the provision in an agricultural implement including a traveling supporting frame, of novel means for mounting a tool shank on the frame to accommodate swinging of the tool and shank in a vertical plane when abnormal draft forces are encountered, and wherein the mounting means includes resilient means yieldably opposing said swinging movement.

Other objects and advantages of the invention will become clear from the following detailed description when read in conjunction with the accompanying drawings wherein:

Fig. 1 is a plan view of a part of an implement frame having an earth-working tool mounted thereon by clamping apparatus incorporating the features of this invention;

Fig. 2 is a sectional view in side elevation of the structure shown in Fig. 1,

Fig. 3 is a side elevation, partly in section, showing the earth-working tool in operation and pivoting against the action of the spring means, and Fig. 4 is an end view on the scale of Fig. 3.

Referring to the drawings, the numeral 10 designates an elongated tubular bar, generally square in cross section, forming a part of an implement supporting frame, and extending transversely of the direction of travel. The transverse bar 10 serves to support a plurality of earth-working units 11, including a tool carrying shank 12, each of which is provided with a forward horizontal, longitudinally extending portion 13. The shank is bent downwardly at its rear end and carries an earth penetrating tool 14.

The tool shank 12 is rectangular in section and the forward horizontal portion 13 is slidably receivable in a rectangular opening 23 conforming generally to the shape of the tool shank and provided in the rear flange 19 of the bracket 16. Bracket 16 is secured to the transverse tool-supporting bar 10 by longitudinally spaced pairs of vertically extending bolts 20 and 21. The upper ends of the bolts 20 and 21 pass through openings provided in a clamping element in the form of a plate 22 engaging the upper surface of the bar 10 and the parts are secured together by the provision of nuts 24 and 25 on the upper ends of the bolt 20 and 21, respectively.

The tool shank 12 and the clamping structure 15 are easily assembled by sliding the forward end 13 of the tool shank through the opening 23 in the rear flange 19 until the end of the shank is received in an open-ended slot 26 extending vertically and formed in the forward

2 depending flange 18. The lower edge of the rectangular slot 23 is inclined forwardly and downwardly, and it should be clear at this point that the tool shank 12 is capable of swinging in a vertical plane as indicated in Fig. 3, about the opening in flange 19 as a pivot.

The forward end of the tool shank moves up and down within the confines of the open-ended slot 26 and is held therein against lateral movement with respect to the clamping structure 15.

The shank 12 is held against longitudinal displacement relative to the clamping structure 15 and tool-supporting bar 10 by the provision of a channel-shaped stop member 27 engaging the lower surface of the tool shank 12 between the flanges 18 and 19, adjacent the latter flange, and secured thereto by a bolt 28 extending through the stop plate 27 and the shank 12. The stop plate 27 is provided with laterally spaced, upwardly extending flanges 29 adapted to engage the depending flange 19.

The tool-supporting shank 12 is held against vertical swinging relative to the supporting frame 10 under normal operating conditions by means resiliently opposing such swinging movement comprising a U-bolt 30 straddling the forward end of the tool shank 12 between the flanges 18 and 19 and spaced therefrom by a block 31. The arms 32 of the U-bolt project upwardly and are passed through spaced somewhat enlarged openings provided in a forward extension of the bracket 16. Each upwardly projecting arm 32 of the U-bolt is surrounded by a spring 33 resting upon the upper surface of the bracket 16 in advance of the tool support 10. Each spring is held between the bracket 16 and a washer 34 by a nut 35 on the threaded upper end of the bolt arm 32. Tension on the spring 33 is thus adjusted by manipulating the nut 35.

In normal operation of the implement the earth-working tool parts are in the position indicated in Fig. 2. In this position the upper surface of the tool shank 12 is in engagement with the lower surface of the base 17 of the bracket 16. The nut 36 on the upper end of bolt 28, in this position, is received in an opening 37 provided in the bracket 16. Likewise, in this position, the heads 38 of bolts 21 are received in notches 39 provided in the upstanding sides 29 of the stop member 27, inhibiting longitudinal movement of the tool shank 12 relative to the clamping structure 15 and the supporting bar 10.

When encountering an obstruction, such as the rock shown in Fig. 3, the tool shank 12 swings upwardly about a transverse axis against the action of the spring 33, and when the obstacle is passed the tool shank is returned to its normal operating position.

From the foregoing it should be clear that applicant has devised a novel and economical mounting for carrying earth-working tools upon a supporting frame. The clamping apparatus by which the tool shank is mounted on the supporting frame is characterized by simplicity and ease of assembly. It should likewise be understood that the invention has been described in its preferred embodiment and that modifications may be made therein without departing from the spirit of the invention or the scope of the appended claims.

What is claimed is:

1. Mounting mechanism for attaching a tool shank to a traveling support, comprising a bracket secured to the support having longitudinally spaced forward and rearward transversely extending depending flanges, the rear flange having an opening therein conforming generally to the shape of the shank to slidably receive the latter and confine it against substantial vertical and lateral movement therein, the forward flange having an open end recess therein to receive the forward end of the shank and confine it against lateral movement while accommodating swinging thereof in a vertical plane about a pivot provided by the opening in the rear flange, means yieldably connecting the shank to the bracket to resist the swinging thereof, and a stop member secured to the shank between said flanges and engageable with one of them to prevent displacement of the shank from the bracket.

2. Mounting mechanism for attaching a tool shank to a traveling support, comprising a bracket secured to the support having longitudinally spaced forward and rearward transversely extending depending flanges, the rear flange having an opening therein conforming generally to the shape of the shank to slidably receive the latter and confine it against substantial vertical and lateral movement therein, the forward flange having an open end recess therein to receive the forward end of the shank and confine it against lateral movement while accommodating swinging thereof in a vertical plane about a pivot provided by the opening in the rear flange, spring means connecting the forward end of the shank to the bracket yieldable to accommodate the swinging thereof, and a stop member affixed to the shank adjacent the rear flange and engageable therewith to resist longitudinal movement of the shank relative to the bracket.

3. The invention set forth in claim 2, wherein at least one of the edges of the opening in the rear flange is beveled to facilitate the pivoting of the shank.

4. Mounting mechanism for attaching a tool shank to a traveling support, comprising a clamping element secured to the support having longitudinally spaced forward and rearward transversely extending vertical flanges, the rear flange having an opening therein conforming to the shape and size of the shank to slidably receive the latter upon insertion of the end of the shank therein and confine it against vertical and lateral shifting relative to the clamping element, an open end recess in the forward flange to slidably receive and laterally confine the shank while accommodating swinging thereof in a vertical plane about the pivot thereof in said rear flange, spring means operatively connecting the forward end of the shank to said clamping element to yieldably resist the swinging of the shank, and an abutment member on said shank separate from and adjacent one of said flanges and engageable therewith to prevent longitudinal movement of the shank relative to said clamping element while accommodating said vertical swinging.

5. The invention set forth in claim 4, wherein said abutment member is a stop plate removably secured to the shank between said flanges to facilitate assembly of the shank in the clamping element.

6. Mounting mechanism for attaching to a traveling support a tool shank having a longitudinally extending attaching portion and a depending tool-carrying portion comprising a clamping bracket secured to the support, a transversely extending generally vertical depending flange on said bracket having an opening therein conforming to the shape of and adapted to slidably receive the attaching portion of the tool shank and confine it against vertical and lateral shifting relative to the clamping bracket, means operatively connecting the forward end of the tool shank projecting beyond said flange to said bracket including spring means accommodating swinging of the shank in a vertical plane about said flange as a pivot, and an abutment member on said shank separate from and adjacent said flange and engageable therewith to prevent longitudinal movement of the shank rearwardly in said opening.

References Cited in the file of this patent

UNITED STATES PATENTS

| 2,493,811 | Graham | Jan. 10, 1950 |
| 2,674,172 | Graham | Apr. 6, 1954 |
| 2,712,780 | Graham | July 12, 1955 |
| 2,712,781 | Rolf | July 12, 1955 |

FOREIGN PATENTS

| 52,985 | Germany | Aug. 6, 1890 |